United States Patent
Kanai et al.

(10) Patent No.: US 6,847,601 B2
(45) Date of Patent: Jan. 25, 2005

(54) DATA RECOVERY APPARATUS AND METHOD

(75) Inventors: Toshio Kanai, Shiga-Ken (JP); Mikiko Roji, Shiga-Ken (JP)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 09/921,837

(22) Filed: Aug. 3, 2001

(65) Prior Publication Data

US 2002/0021645 A1 Feb. 21, 2002

(30) Foreign Application Priority Data

Apr. 8, 2000 (JP) ........................................ 2000-236599

(51) Int. Cl.⁷ ................................................ G11B 7/00
(52) U.S. Cl. .............................. 369/59.17; 369/124.13; 369/59.16
(58) Field of Search ........................... 369/47.26, 47.35, 369/59.15, 59.16, 59.17, 59.19, 59.21, 59.26, 124.05, 124.07, 124.08, 124.13, 124.14, 124.15, 47.18, 59.22, 53.35

(56) References Cited

U.S. PATENT DOCUMENTS

| | | | | |
|---|---|---|---|---|
| 5,677,802 A | * | 10/1997 | Saiki et al. | 369/47.35 |
| 5,847,891 A | * | 12/1998 | Ohmori et al. | 360/65 |
| 6,028,727 A | * | 2/2000 | Vishakhadatta et al. | 369/59.21 |
| 6,697,311 B1 | * | 2/2004 | Kim | 369/59.1 |
| 6,754,025 B1 | * | 6/2004 | Shepherd et al. | 360/51 |

FOREIGN PATENT DOCUMENTS

| | | |
|---|---|---|
| JP | PUPA63-044370 | 2/1988 |
| JP | PUPA02-137128 | 5/1990 |
| JP | PUPA05-334754 | 12/1993 |
| JP | PUPA05-343988 | 12/1993 |
| JP | PUPA07-169059 | 7/1995 |
| JP | 94309657.8 | 7/1995 |
| JP | PUPA08-293163 | 11/1996 |
| JP | PUPA11-008656 | 1/1999 |
| JP | PUPA11-073733 | 3/1999 |
| JP | PUPA11-259986 | 9/1999 |
| JP | PUPA11-328866 | 11/1999 |
| JP | PUPA2000-113606 | 4/2000 |
| WO | PCT/US93/02658 | 9/1993 |
| WO | PCT/US97/04906 | 11/1997 |

* cited by examiner

*Primary Examiner*—Thang V. Tran
*Assistant Examiner*—Bach Vuong
(74) *Attorney, Agent, or Firm*—William D. Gill; Dillon & Yudell LLP

(57) ABSTRACT

To correct a bit shift of binary data read from a medium and further enable correction of a bit error caused by miscorrection of the bit shift, a data recovery apparatus according to the present invention comprises: circuits for respectively correcting time at an intersection of a read signal and a slice signal; and a circuit for generating gray bits representing a time cell including an intersection, the time of the intersection being uncorrected and a time cell adjacent to the time cell, positioned in the direction of the intersection being shifted for correction.

19 Claims, 9 Drawing Sheets

ND METHOD

BACKGROUND OF THE INVENTION

1. Technical Field

The present invention relates to an apparatus for recovering data from a data recording medium and a method thereof. More particularly, it relates to an apparatus and a method for recovering data while correcting an error in a READ signal read from the data recording medium.

2. Description of the Related Art

Typical examples of recording media for storing data, such as documents, images, and sound are a HD (Magnetic Disk), a DVD (Digital Video Disk or Digital Versatile Disk), an MO (Mageneto-optic Disk), a CD (Compact Disk), and an LD (Laser Disk), or the like. FIG. 7(a) shows an outline of a data recovery apparatus 70 for recovering data from a medium 78. A READ signal read from the medium 78 is digitized with a level determining unit 72 to be converted to a bit string composed of 0 and 1. The bit string (binary data) is sent to a decoder 74 to be decoded by using, for example, a translation table 76.

FIG. 7(b) shows an example of the structure of the level determining unit 72. A READ signal read from a medium 78 is compensated by an equalizer 88 and then input to one of two inputs of a slice circuit 80 and a slice signal generation circuit 86. A slice signal Vr generated by the slice signal generation circuit 86 is input to the other input of the slice circuit 80. The slice circuit 80 detects an intersection of the equalized signal V(t) and the slice signal Vr and then sends a detection signal to a binary data generation circuit 82. The binary data generation circuit 82 defines time cells based on the frequency of the equalized signal V(t) which is detected by a PLL (Phase Locked Loop) 84 to generate binary data.

FIG. 8 shows a method for creating a binary signal from the equalized signal V(t). Time cells are defined in a time-axis direction (t) on the basis of the frequency of the equalized signal V(t) detected by the PLL 84. Binary data is obtained by defining time cells including time T1 and T2 at the intersections of the equalized signal V(t) and the slice signal Vr as 1, and the time cells not including the intersections are defined as 0.

The precision of the creation of binary signals from the equalized signal depends on shifts in the intersections of the equalized signal V(t) and the slice signal Vr. As the shifts of the intersections become larger, the possibility that the intersections are allocated to incorrect time cells grows. When data is recovered from the medium 78, such as CD and DVD, variation of light reflectivity, interference between waveforms, and noise or the like adversely affect the equalized signal V(t). As a result, a bit shift by 1 bit often occurs.

The equalizer 88 adjusts the gain-frequency characteristics of the READ system. As shown in FIG. 9, an output of the high frequency side is mainly amplified. A dashed line shown in FIG. 9 is an output from the medium 78 and a continuous line is an output after being amplified by the equalizer 88. Although the amplification of the output performed by the equalizer 88 compensates the output of the high frequency side, noise is also amplified.

The equalizer 88 is constructed of, for example, a 7 to 17-stage transversal filter circuit. Removable media, such as DVD, require for compensation a filter circuit for each medium. When there are flaws and warping or the like in a medium such as DVD, the setting of the filter circuit may be needed to be modulated for each track or each sector. It is difficult to optimize an equalizer for each track or each sector because a great amount of calculation is required to determine the optimum setting for correction.

FIG. 10 illustrates a bit shift example when noise or characteristic degradation have affected the equalized signal. In the equalized signal V(t) shown in FIG. 10, the waveform is changed from the signal indicated at the dotted line to that indicated at the solid line. The intersection of the equalized signal V(t) and the slice signal Vr is shifted from the should-be time t to time t'. As a result, bit "1" is shifted to a time cell which is adjacent to the left side in the figure.

The slice signal Vr output from the slice signal generation circuit 86 is defined based on a peak-to-peak value of the equalized signal V(t) or the operation result of DSV (Digital Sum Variation). DSV is an accumulated value determined by adding a value of +1 when the equalized signal V(t) at the time of digitization is larger than the slice signal Vr and a value of −1 when the equalized signal V(t) is smaller than the slice signal Vr. The slicing level is set so that DSV can be zero. As shown in FIGS. 11 (a) and 11(b), when the level of the slice signal Vr is shifted to Vr', Time T1 and T2 at the intersections are shifted to T1' and T2'. This may cause a bit shift.

It is an object of the present invention to correct a bit shift of binary data read from a medium and further enable correction of a bit error due to mis-correction of the bit shift.

SUMMARY OF THE INVENTION

A data recovery apparatus according to one aspect of the present invention comprises: a circuit for correcting time at an intersection of a READ signal and a slice signal; a circuit for generating a gray bit representing a time cell including an intersection, where time is uncorrected and a time cell adjacent to the time cell in the direction of the intersection being shifted for correction; and a circuit for correcting an error in a bit string on the basis of the gray bit. This data recovery apparatus is capable of not only correcting a bit shift but correcting a bit error due to mis-correction of the bit shift.

A data recovering method according to another aspect of the present invention includes the steps of: correcting time at a detected intersection; generating a gray bit representing a time cell including an intersection, where time is uncorrected and a time cell adjacent to the time cell in the direction of the intersection being shifted for correction; and correcting an error bit in a bit string on the basis of the gray bit.

The present invention is capable of correcting a bit shift which may occur in a signal read out of a recording medium. Further, the gray bits generated upon bit shift correction enables correction of a bit error due to mis-correction of the bit shift.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 11(a) is a view wherein the slice signal Vr slides in the upper direction of the view. FIG. 11(b) is a view wherein the slice signal Vr slides in the lower direction of the view.

DESCRIPTION OF THE PREFERRED EMBODIMENT

Next, a preferred embodiment of a data recovery apparatus and a method thereof according to the present invention will be described in detail with reference to the accompanying drawings.

Figure 1A:
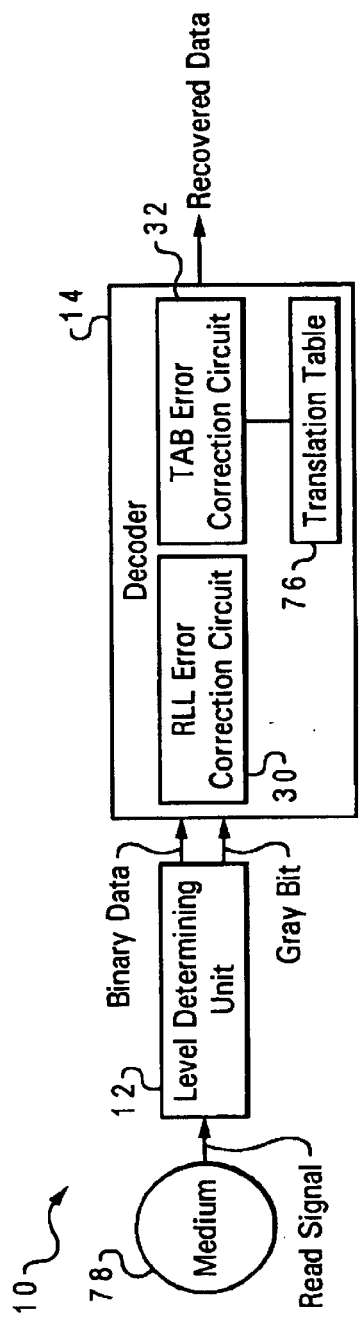
FIG. 1(a) is a block diagram showing an example of a data recovery apparatus according to the present invention.

As shown in FIG. 1(a), a data recovery apparatus 10 of the present invention comprises a level determining unit 12 and a decoder 14. A data recording medium 78 is selected from a group consisting of a magnetic disk, a digital video disk, a magneto-optic disk, a compact disk, and a laser disk and the like.

Figure 1B:
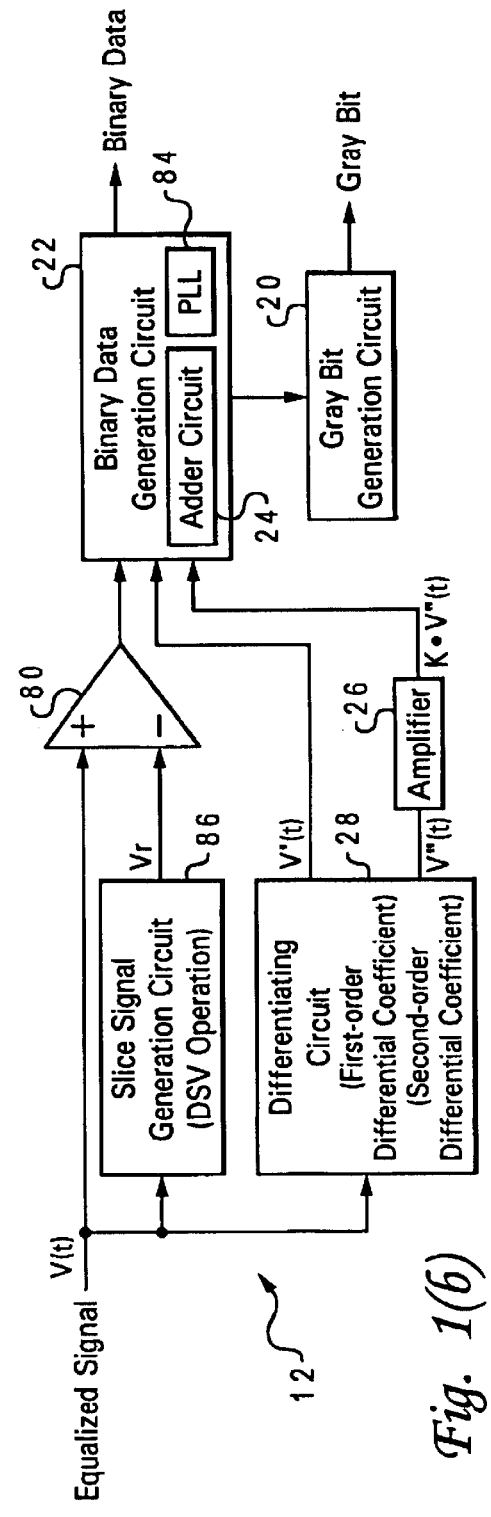
FIG. 1(b) is a block diagram showing an example of a level determining unit shown in FIG. 1(a).

As shown in FIG. 1(b), the level determining unit 12 comprises an adder circuit 24 for correcting time at an intersection of an equalized signal V(t) and a slice signal V, a differentiating circuit 28, and an amplifier 26. Conventional circuits may be used for a slice signal generation circuit 86, a slice circuit 80, and a PLL 84. An equalized signal is generated by equalizing a READ signal.

A correction value is calculated using the differentiating circuit 28 and the amplifier 26, and the calculated correction value is added to the time at the intersection by the adder circuit 24. The differentiating circuit 28 determines a first-order differential coefficient V'(t) and a second-order differential coefficient V"(t) of the equalized signal V(t) at an intersection. The amplifier 26 calculates a correction value by multiplying the second-order differential coefficient V"(t) by K (K>0). The value of K depends on characteristics of the medium used, the optical system for detection, the electrical signal processing circuit and so on, so that the value is usually determined empirically. In the case of DVD, the value is within the range of 0 to 1/32, and 1/64 was used in a disclosed embodiment. In the adder circuit 24, the correction value is added to the time at the intersection after the sign of the correction value (positive or negative) is decided based on the first-order differential coefficient and the second-order differential coefficient calculated by the differentiating circuit 28.

The equalized signal read from the medium 78 is an analog signal, but the signal is converted to a digital signal by an analog to digital converter (not shown) when the signal is sent to the level determining unit 12. An equalized signal V (n(t)) converted to a digital signal is stored in a memory (not shown). In this case, n(t) is an integer defined by time t, and $$n(t)=1, 2, 3, \ldots$$

the second-order differential coefficient V"(n(t)) of V (n(t)) can be determined by the following equations:

$$V(n(t)-1)-2 \times V(n(t))+V(n(t)+1) \quad \text{(Equation 1)}$$

where, n (t) ≧ 2

$$\text{or } V(n(t)-3)-V(n(t)-1)-V(n(t)+1)+V(n(t)+3) \quad \text{(Equation 2)}$$

where, n (t) ≧ 4

V(n(t)) hereinafter represents simply V(t).

Figure 2A:
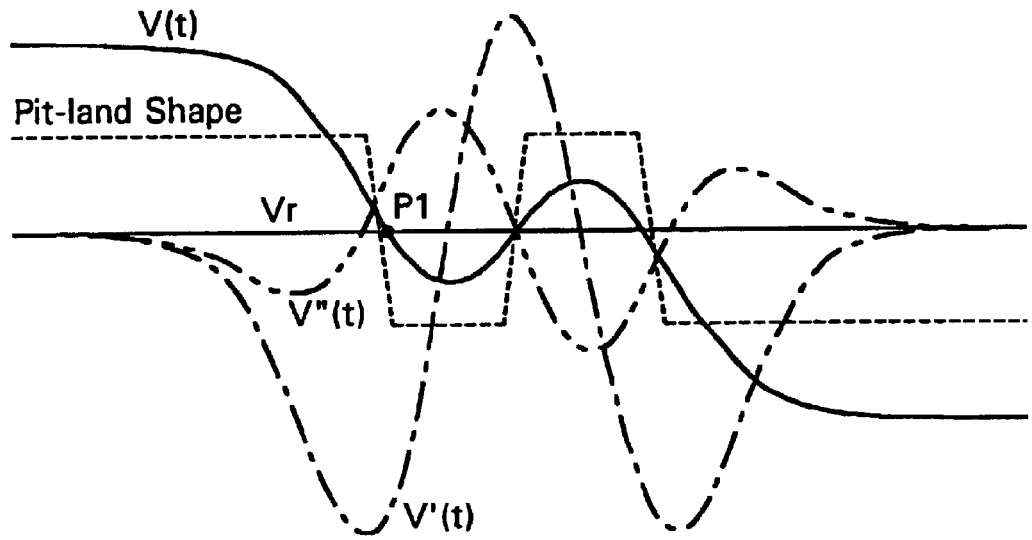
FIG. 2(a) shows waveforms of an equalized signal V(t), a first-order differentiation V'(t) of the equalized signal V(t), a second-order differential coefficient V"(t) of the equalized signal V(t), and a slice signal Vr.
Figure 2B:
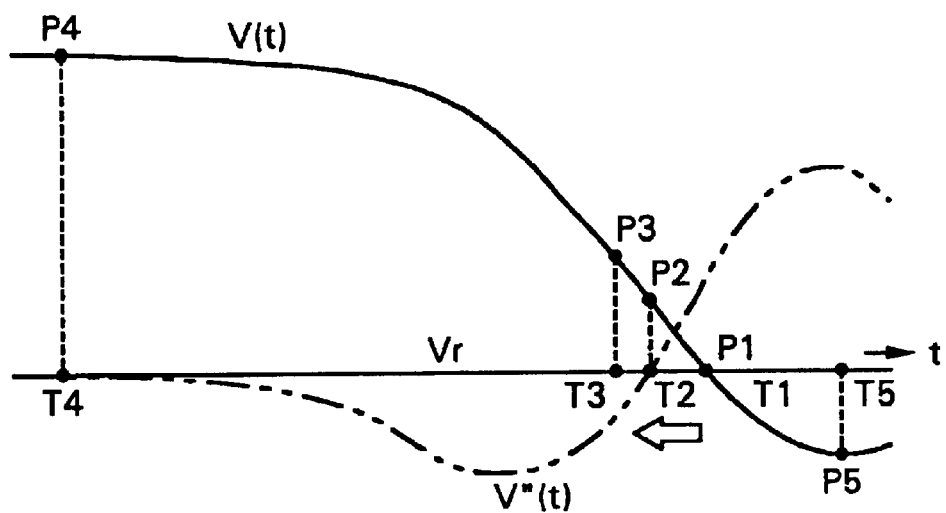
FIG. 2(b) is an enlarged view of an important portion in FIG. 2(a).

FIG. 2(a) shows an example of the equalized signal V(t) and the slice signal Vr. The first-order differential coefficient V'(t) and the second-order differential coefficient V"(t) of the equalized signal V(t) are determined by the differentiating circuit 28. In FIG. 2(a), Vr is assumed to be zero. FIG. 2(b) shows an enlarged figure of the portion of the intersection P1 among the equalized signal V(t), the slice signal Vr, and the second-order differential coefficient V"(t) shown in FIG. 2(a).

The point P1 (time t=T1) shown in FIG. 2(b) is an intersection of the equalized signal V(t) and the slice signal Vr. This is expressed by the following equation:

$$V(T1)=Vr$$

Points P4 and P5 are each a peak point before and behind the intersection P1. Point P3 is an intermediate point between P4 and P5. This is expressed by the following equation:

$$V(T3)=\{V(T4)+V(T5)\}/2$$

Point P2 is an inflection point of the equalized signal V(t) between P4 and P5. This is expressed by the following equation:

$$V''(T2)=0$$

Correction of time T1 is carried out in the direction of an intermediate point P3 (Time T3) between peak points P4 and P5 before and behind the intersection P1. In this embodiment, a correction is made by shifting T1 to the direction of the inflection point P2 (Time T2) of the equalized signal V(t) between P4 and P5. The direction of P2 which is the shift direction of P1 intended for correction can be determined depending on whether the values of the first-order differential coefficient V'(T1) and the second-order differential coefficient V"(T1) of the equalized signal V(t) at P1 are respectively positive or negative. A value K×V"(T1) in proportion to the second-order differential coefficient V"(T1) at P1 is used as a correction value. The value of K depends on the characteristics of the medium used, the optical system for detection, the electrical signal processing circuit and so on, so that it is usually empirically. In the case of DVD, the value is within the range between 0 and ⅟₃₂, ⅟₆₄ was used in an embodiment of the present invention.

Assuming that compensated time at the intersection P1 is defined as T1', when as shown in FIG. 2(b), the gradient or the first-order differential coefficient V'(T1) of the equalized signal V(t) at time T1 is negative, and the second-order differential coefficient V"(T1) is positive, the following operation is performed by the adder circuit 24:

$$T1'=T1-K\times V''(T1) \quad \text{(Equation 4)}$$

Figure 3A:
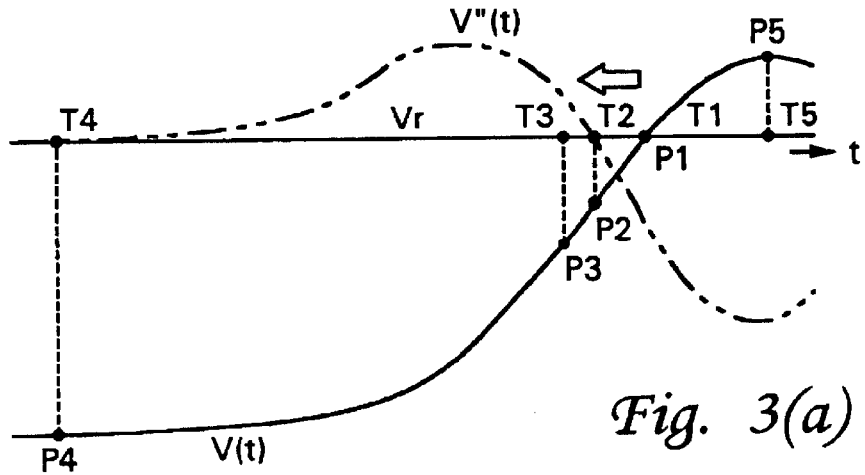
FIGS. 3(a) to 3(c) show three patterns of waveforms of an equalized signal V(t), the second-order differential coefficient V"(t) of the equalized signal V(t), and a slice signal Vr.

Similarly, as shown in FIG. 3(a) when the gradient or the first-order differential coefficient V'(T1) of the equalized signal V(t) at time T1 (intersection P1) is positive and the second-order differential coefficient V"(T1) of the signal V(t) is negative, the following operation is performed by the adder circuit 24:

$$T1'=T1+K\times V''(T1) \quad \text{(Equation 4)}$$

Figure 3B:
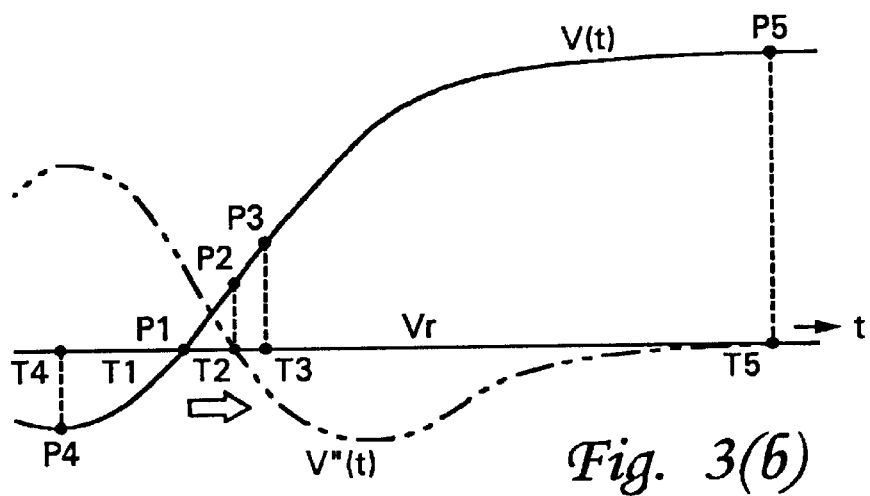

As shown in FIG. 3(b), when the gradient or the first-order differential coefficient V'(T1) of the equalized signal V(t) at T1 is positive and the second-order differential coefficient V"(T1) of the signal V(t) is positive, the following operation is performed by the adder circuit 24:

$$T1'=T1+K\times V''(T1) \quad \text{(Equation 5)}$$

Figure 3C:
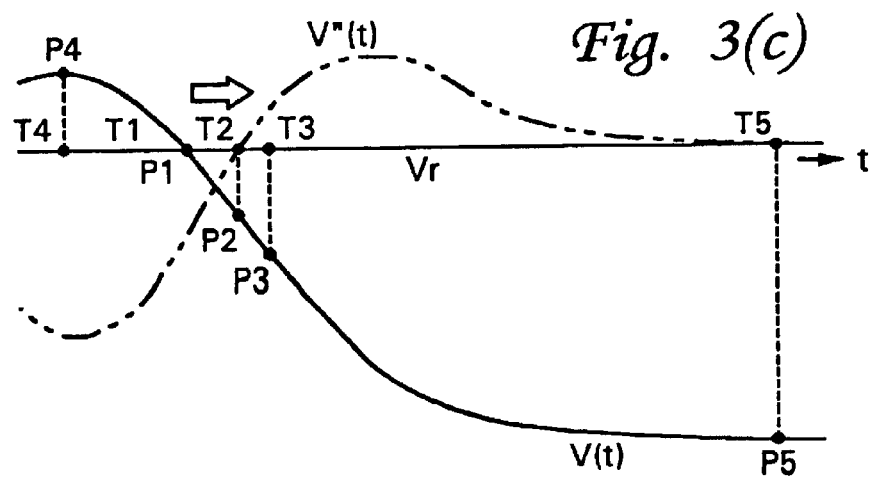

As shown in FIG. 3(c), the gradient or the first-order differential coefficient V'(T1) of the equalized signal V(t) at T1 is negative and the second-order differential coefficient V"(T1) of the signal V(t) is negative, the following operation is performed by the adder circuit 24:

$$T1'=T1-K\times V''(T1) \quad \text{(Equation 6)}$$

A binary data generation circuit 22 generates binary data based on compensated time at intersections and time cells in the same manner as in a conventional binary data generation circuit 82.

Figure 4:
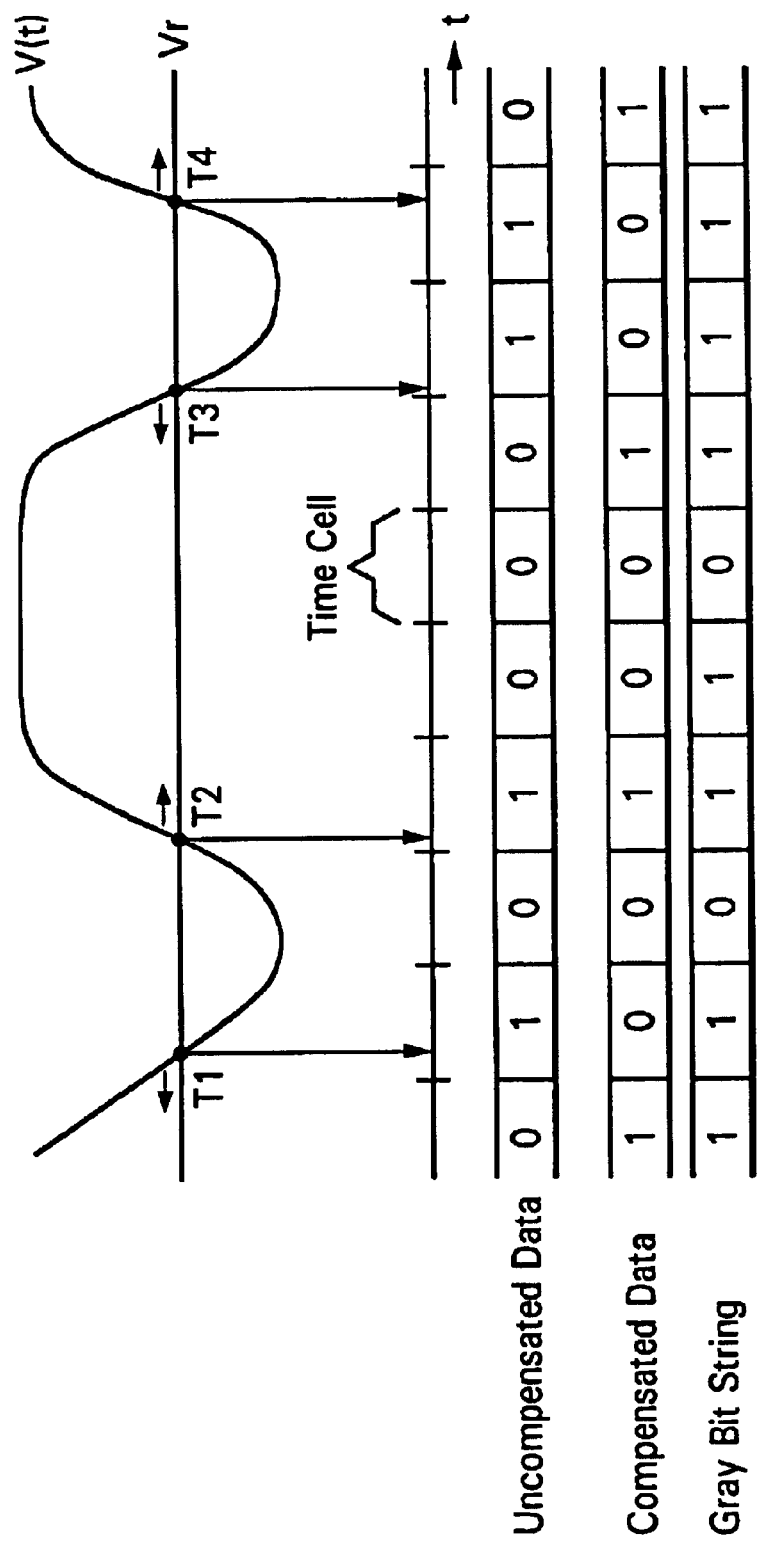
FIG. 4 shows a gray bit string for representing correction of binary data determined from an intersection of an equalized signal V(t) and a slice signal Vr, and corrected bits.

The level determining unit 12 according to the present invention further includes a gray bit generation circuit 20 for generating gray bits representing a time cell including an intersection, where time is uncompensated and a time cell adjacent to the time cell in the direction in which the uncompensated intersection is shifted for compensation. The gray bit generation circuit 20 sets, as shown in FIG. 4, flag "1" for time cells each including an uncompensated intersection and for time cells adjacent to the time cells in the direction of the uncompensated intersections being shifted for compensation. The gray bits are sent to the decoder 14 together with the binary data.

The decoder 14 decodes the binary data, for example, using a translation table 76 in the same manner as in a conventional decoder. The decoder 14, according to the present invention, comprises an RLL (Run-length limited) error correction circuit 30 for correcting an error in a bit string on the basis of the gray bits and RLL rules, and a Tabulation (TAB) error correction circuit 32 for correcting an error bit using the gray bits and a translation table 76.

The RLL error correction circuit 30 corrects an error bit on the basis of the RLL rules. On checking the run-length of the bit string to detect the error bit which violates the RLL rules, the detected error bit is corrected on the basis of the gray bits. If the error bit has been corrected by the adder circuit 24, it is returned to the initial uncompensated bit on the basis of the gray bits.

The TAB error correction circuit 32 corrects an error bit using the translation table 76. Since an error is detected when the bit string does not exist in the translation table 76, the bit string wherein the error has been detected is corrected based on the gray bits in the same manner as in the RLL error.

Next, a description will be given to the operation of data recovery using this data recovery apparatus 10 and a method thereof.

An equalized signal V(t) read from a medium 78 is respectively input to a slice circuit 80, a slice signal generation circuit 86, and a differentiating circuit 28. As mentioned above, the equalized signal is, however, converted from an analog signal to a digital signal when the equalized signal is inputted to a level determining unit 12. The slice signal generation circuit 86 outputs a slice signal Vr to the slice circuit 80 in the same manner as in a conventional slice signal generation circuit. The circuit 80 sends a detection signal to a binary data generation circuit 22 after detecting an intersection of the equalized signal V(t) and the slice signal Vr in the same manner as in a conventional slice circuit.

The first-order differential coefficient V'(t) and the second-order differential coefficient V"(t) of the equalized signal V(t) at the intersection are determined by the differentiating circuit 28 (Equation 1 or Equation 2). The first-order differential coefficient V'(t) is sent to the binary data generation circuit 22 and the second-order differential coefficient V"(t) is sent to the binary data generation circuit 22 after being multiplied by k in the amplifier 26.

The correction value K×V"(t) sent to the binary data generation circuit 22 is added to the time at the intersection by the adder circuit 24. After the sign (+ or -) of the correction value to be added is determined based on the first-order differential coefficient V'(t) and the second-order differential coefficient V"(t) of the equalized signal V(t), the correction value is added to the time at the intersection (Equation 3, Equation 4, Equation 5, and Equation 6). Adding the correction value to the time at the intersection enables correction of a bit shift by correcting the time at the intersection.

The binary data generation circuit 22 generates binary data based on presence or absence of an intersection in a time cell in the same manner as in a conventional binary data generation circuit 82. The bit string wherein the bit shift has been compensated is sent to the decoder 14.

As shown in FIG. 4, a gray bit string, wherein time cells each including an uncompensated intersection and time cells adjacent to the time cells in the direction of the uncompensated intersections being shifted for compensation are defined as binary "1", is generated in the gray bit generation circuit 20. The gray bit string is sent to the decoder 14 together with the data bit string.

The decoder 14 corrects a bit error in the binary data in the present invention, as well as decoding the binary data in the same manner as in a conventional decoder. The error correction performed by the decoder 14 in this embodiment of the present invention is mainly correcting the mis-correction of the level determining unit 12. When the error bit is one corrected by the determining unit 12, the corrected bit is returned to the initial uncorrected or uncompensated bit.

An explanation will be given to correction by the adder circuit 24 and the decoder 14 assuming that correct data is "010010". It is assumed that the RLL rules define the number of "0" between "1" and "1" as 2 to 10. The following case has no error because its data has been properly corrected:

Uncompensated data: 010100
data: 010010
Gray bit string: ••••••: 110110

The following case has been improperly corrected:
Uncompensated data: 010010
Compensated data: 010100
Gray bit string ••••••: 110110
RLL error: 000100

An RLL error is detected because the number of "0" between "1" and "1" is 1. After the RLL error is detected, the RLL error correction circuit 30 returns the corrected bit portion to an uncompensated bit based on a gray bit string.

The following case has been improperly corrected:
Uncompensated data: 010010
Compensated data: 010001
Gray bit string ••••••: 110011
RLL error: 000000

Since the number of "0" between "1" and "1" is 3, the RLL error is not detected. When the compensated data 010001 does not exist in a translation table 76, however, an error is detected. When an error is detected, a TAB error correction circuit 32 returns the corrected bit portion to the initial uncompensated bit on the basis of the gray bit string.

As described above, the apparatus and the method for recovering data of the present invention are capable of correcting a bit shift by correcting time at an intersection of an equalized signal and a slice signal. Correction of the time at the intersection can be performed without regard to operations of PLL. Correction is possible even when the time has been improperly corrected because of the generation of information (gray bits) representing a time cell including an intersection, where time is uncorrected and a time cell adjacent to the time cell in the shift direction for correction.

As mentioned above, one embodiment according to the present invention has been described so far, but the present invention is not limited to this embodiment. For example, it is possible to send a gray bit string and binary data without compensation of intersections by the level determining unit 12 to cause the decoder 14 to correct the uncompensated data based on the gray bits.

Figure 5A:
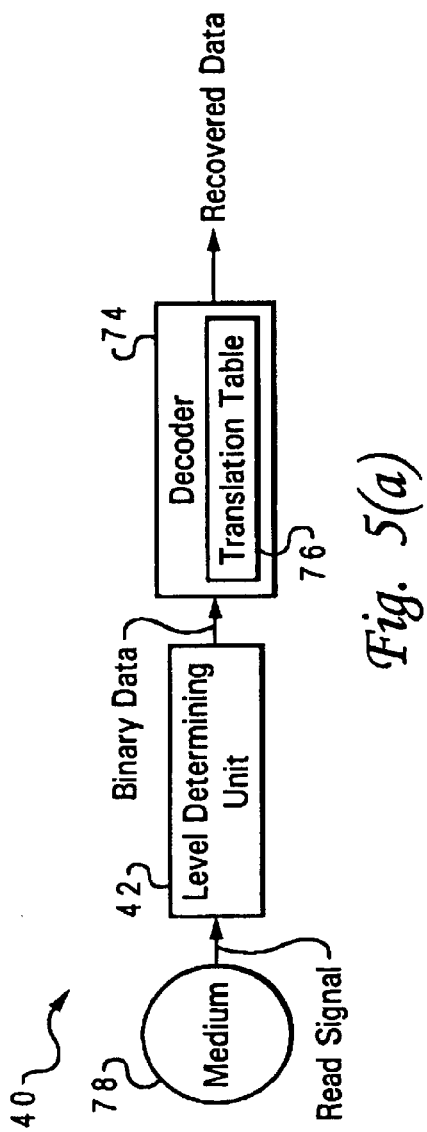
FIG. 5(a) is a block diagram showing another example of a data recovery apparatus according to the present invention.
Figure 5B:
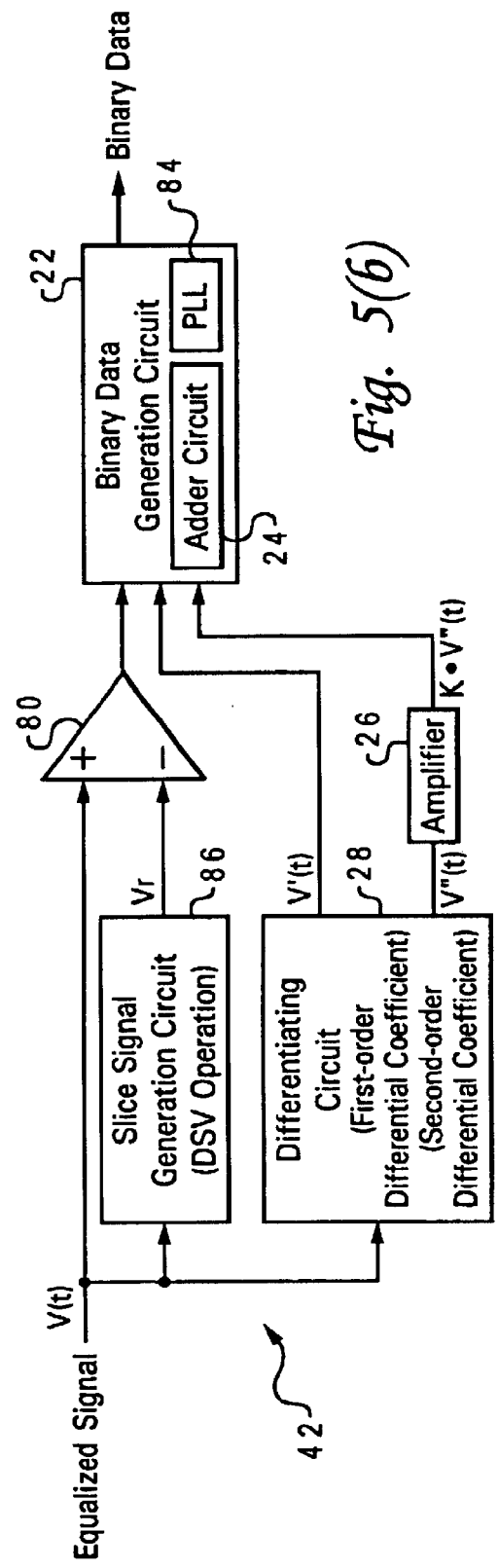
FIG. 5(b) is a block diagram showing an example of a level determining unit shown in FIG. 5(a).

When the frequency of occurrences of mis-correction of the intersection is low, as shown in FIGS. 5(a) and 5(b), a data recovery apparatus 40 may be constructed without being equipped with a gray bit generation circuit.

Figure 6:
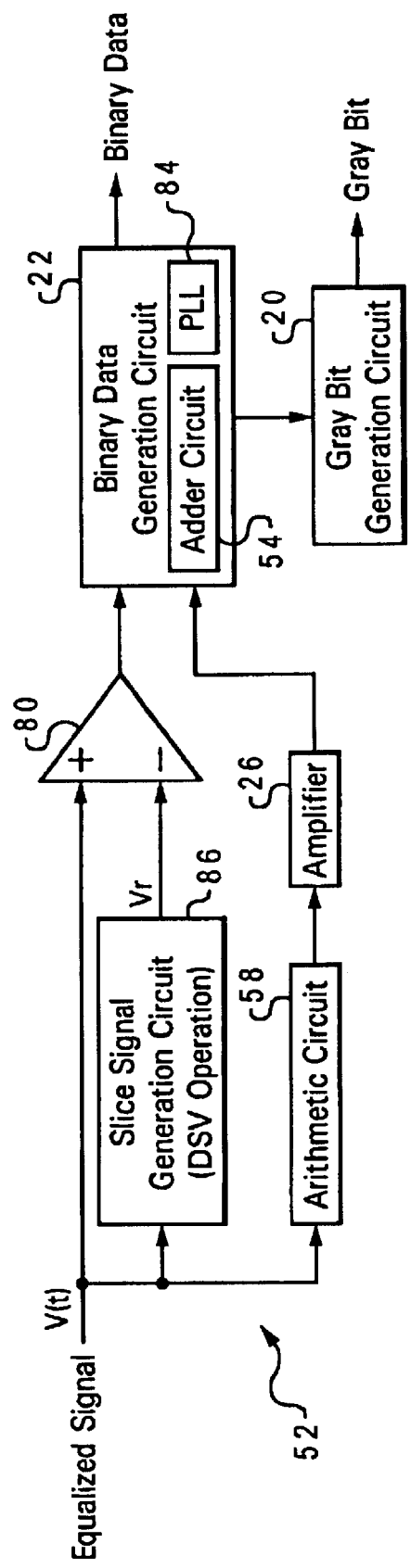
FIG. 6 is a block diagram showing another example of a level determining unit of a data recovery apparatus according to the present invention.
Figure 7A:
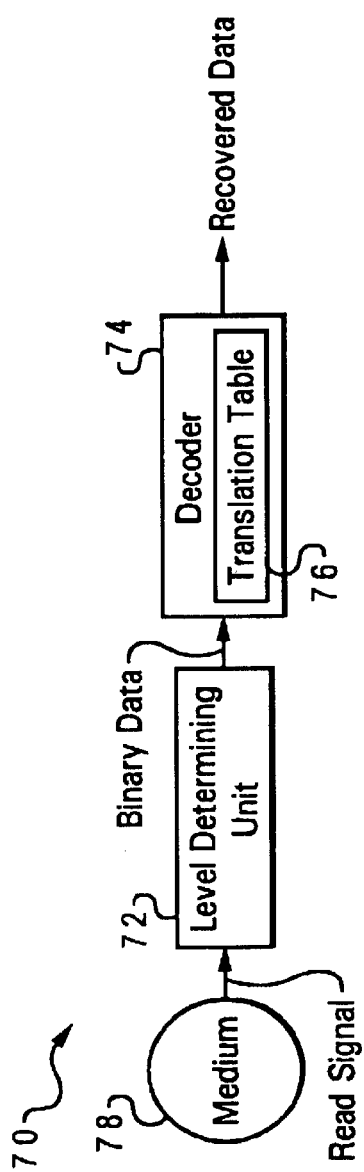
FIG. 7(a) is a block diagram showing an example of a conventional data recovery apparatus.
Figure 7B:
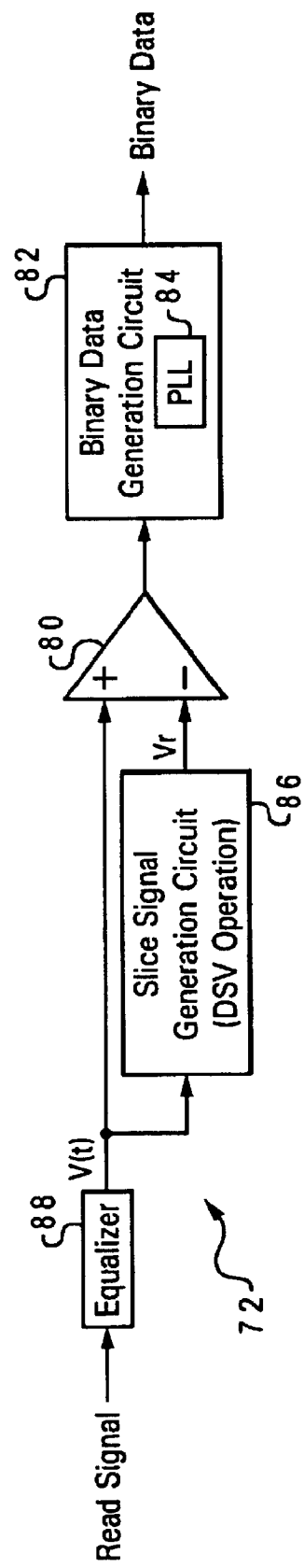
FIG. 7(b) is a block diagram showing an example of a level determining unit shown in FIG. 7(a).
Figure 8:
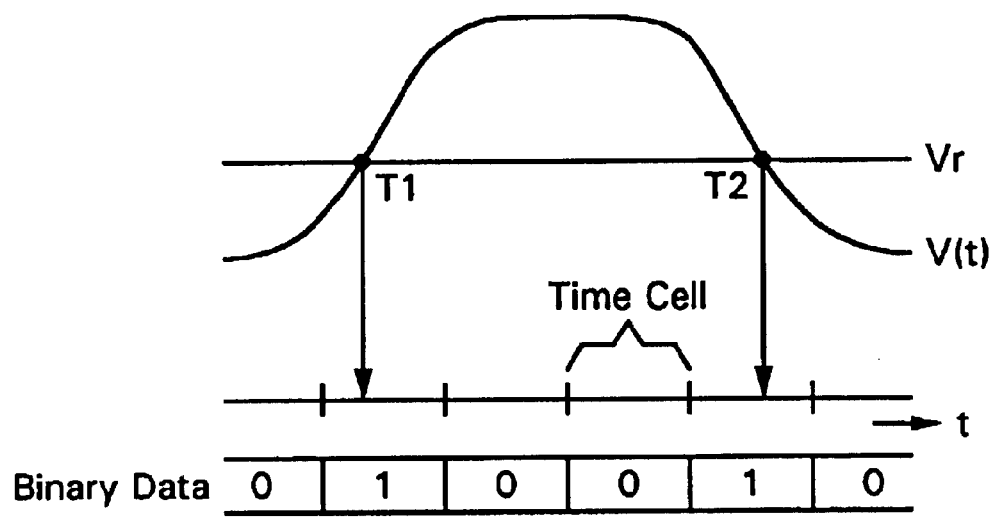
FIG. 8 is a block diagram showing an example of binarization of an equalized signal.
Figure 9:
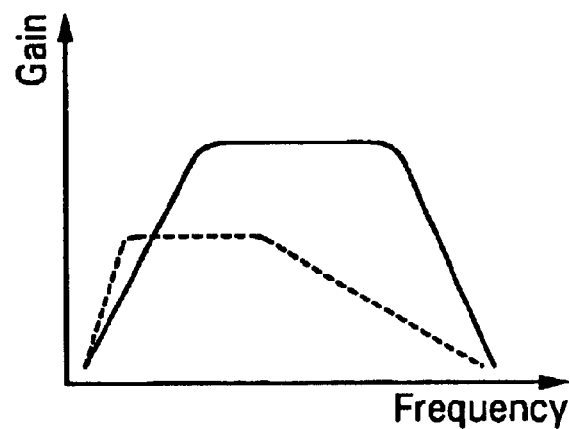
FIG. 9 shows an example of output compensation of an equalizer.
Figure 10:
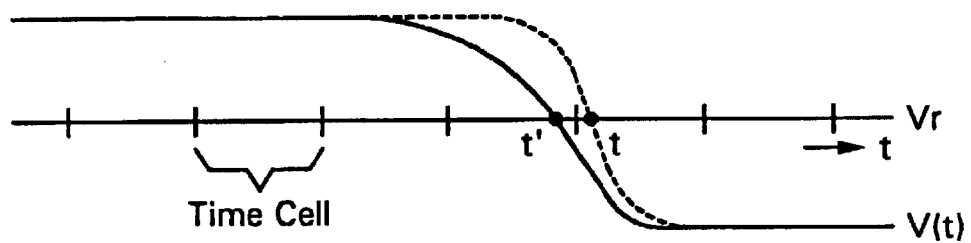
FIG. 10 shows an equalized signal V(t) deformed by a slice signal Vr and noise.
Figure 11A:
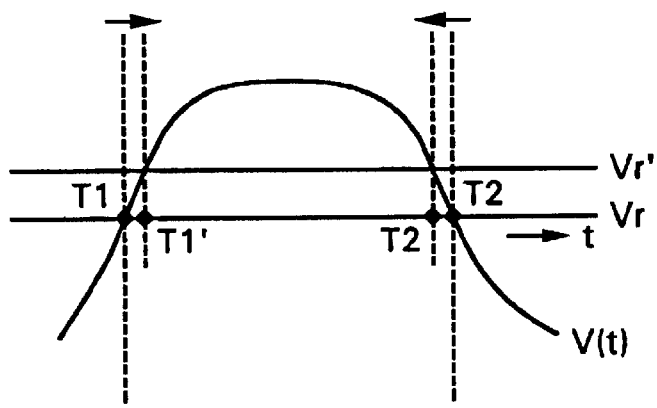
FIGS. 11(a) and 11(b) respectively show waveforms of an equalized signal V(t) and a slice signal Vr.
Figure 11B:
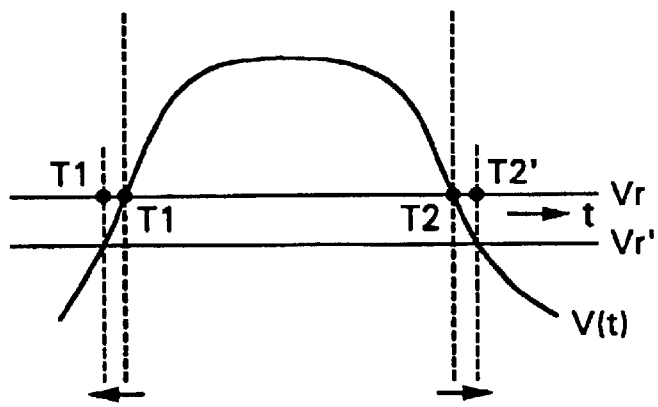

As shown in FIG. 6, it is also possible to use a level determining unit 52 including an arithmetic circuit 58 which can perform at least addition and division to calculate a value V (T3) at an intermediate point P3 between peak points P4 and P5 before and behind an intersection P1 shown in FIGS. 2(b), 3(a), 3(b), and 3(c):

$$V(T3)=\{V(T4)+V(T5)\}/2$$

which may be used instead of the second-order differential coefficient V"(T1).

For example, as shown in FIG. 2(b), if the compensated time of the intersection P1 is assumed to be T1', when the gradient or the first-order differential coefficient of the equalized signal V (t) at time T1 is negative, and the value of V (T3) of the equalized signal V (t) at the intermediate point P3 is positive, the following operation is performed by the adder circuit 24:

$$T1'=T1-K'\times V(T3)$$

Instead of the peak points P4 and P5, values V(T1−ΔT) and V(T1+ΔT) before and behind time T1 (intersection P1) may be used. Specifically, the following value may be used instead of the second-order differential coefficient V"(T1):

$$\Delta V(T1)=\{V(T1-\Delta T)+V(T1+\Delta T)\}/2$$

For example, if compensated time of the intersection P1 is assumed to be Ti', when the gradient of the equalized signal V (t) at T1 is negative and the value of ΔV (T1) is positive, the following operation is performed by the adder circuit 24.

$$T1'=T1-K''\times \Delta V(T1)$$

Depending on the magnitude of the correction value, the gray bit generation circuit 20 may set a gray bit to "1". Only when the correction value is not less than a predetermined value, a flag "1" may be set for a time cell adjacent in the direction of shifting for correction.

As described above, specific embodiments of the present invention have been variously described so far, but the present invention is not limited to these embodiments. Also, any modification, variations or equivalent arrangements which may occur to those skilled in the art should be considered to be within the scope of the invention.

There have thus been shown and described a data recovery apparatus and a method thereof which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All changes, modifications, variations and other uses and applications which do not depart from the spirit or scope of the present invention are deemed to be covered by the invention, which is to be limited only by the claims which follow.

What is claimed is:

1. An apparatus for recovering data by decoding a bit string indicative of presence or absence of an intersection in a time cell, comprising:

a circuit for generating a slice signal, said signal being a reference for digitization of a read signal read from a data recording medium;

a circuit for detecting an intersection of the read signal and the slice signal;

a circuit for defining a time cell on the read signal based on the frequency of the signal;

a circuit for correcting time at the detected intersection;

circuit for generating a bit string based on presence or absence of the time-corrected intersection in a time cell; and a circuit for decoding the generated bit string.

2. The apparatus according to claim 1, wherein said circuit for correcting time at the detected intersection comprises:

a circuit for calculating a correction value; and a circuit for adding the calculated correction value to the time at the intersection.

3. The apparatus according to claim 2, wherein said circuit for calculating a correction value comprises:

a circuit for determining a second-order differential coefficient of the read signal at an intersection; and a circuit for calculating the correction value from the value of the determined second-order differential coefficient.

4. The apparatus according to claim 2, wherein said circuit for adding the calculated correction value comprises:
   a circuit for determining from the values of a first-order differential coefficient and the second-order differential coefficient of the read signal at the intersection whether the correction value is positive or negative; and
   a circuit for adding the determined correction value to the time at the intersection.

5. The apparatus according to claim 1, wherein said circuit for generating a bit string further comprises:
   a circuit for generating a gray bit representing a time cell including an intersection, the time of said intersection being uncorrected, and a time cell adjacent to the time cell, positioned in the direction of the intersection being shifted for correction.

6. The apparatus according to claim 5, wherein said circuit for decoding the bit string further comprises a circuit for correcting an error in the bit string on the basis of the gray bit.

7. The apparatus according to claim 6, wherein said circuit for correcting an error comprises a circuit for correcting an error bit on the basis of run-length limited (RLL) rules.

8. The apparatus according to claim 6, wherein said circuit for correcting an error comprises a circuit for correcting the error bit using a translation table.

9. The apparatus according to claim 1, wherein said data recording medium is selected from a group consisting of a magnetic disk, a digital video disk, a magneto-optic disk, a compact disk, and a laser disk.

10. A method for recovering data comprising the steps of:
    generating a slice signal, said signal being a reference for digitization of a read signal read from a data recording medium;
    detecting an intersection of the read signal and the slice signal;
    defining a time cell on the read signal based on the frequency of the signal;
    correcting time at the detected intersection;
    generating a bit string based on presence or absence of the time-corrected intersection in a time cell; and
    decoding the generated bit string.

11. The method according to claim 10, wherein said step of correcting time at the intersection includes the steps of:
    calculating a correction value; and
    adding the calculated correction value to the time at the intersection.

12. The method according to claim 11, wherein said step of calculating a correction value includes the steps of:
    determining a second-order differential coefficient of the read signal at the intersection; and
    calculating the correction value from the value of the determined second-order differential coefficient.

13. The method according to claim 11, wherein said step of adding the calculated correction value to the time at the intersection includes the steps of:
    determining from the values of the first-order differential coefficient and the second-order differential coefficient of the read signal at the intersection whether the correction value is positive or negative; and
    adding the determined correction value to the time at the intersection.

14. The method according to claim 10, wherein said step of generating a bit string further includes the step of:
    generating a gray bit representing a time cell including an intersection, the time of said intersection being uncorrected, and a time cell adjacent to the time cell, positioned in the direction of the intersection being shifted for correction.

15. The method according to claim 14, wherein said step of decoding the bit string further includes the step of correcting an error bit in the bit string on the basis of the gray bit.

16. The method according to claim 15, wherein said step of correcting an error bit includes the step of correcting the error bit on the basis of run-length limited (RLL) rules.

17. The method according to claim 16, wherein said step of correcting an error bit on the basis of RLL rules includes the steps of:
    detecting the error bit in a bit string based on the RLL rules; and
    correcting the detected error bit on the basis of the gray bit.

18. The method according to claim 16, wherein said step of correcting an error bit includes the step of correcting the error bit using a translation table.

19. The method according to claim 10, wherein said data recording medium is selected from a group consisting of a magnetic disk, a digital video disk, a magneto-optic disk, a compact disk, and a laser disk.

* * * * *